(12) United States Patent
Sugaya (10) Patent No.: US 10,463,031 B2
(45) Date of Patent: Nov. 5, 2019

(54) FIXING STRUCTURE FOR FISHING LINE GUIDE, AND FISHING ROD

(71) Applicant: Globeride, Inc., Tokyo (JP)

(72) Inventor: Eiji Sugaya, Tokyo (JP)

(73) Assignee: Globeride, Inc., Tokyo (JP)

( * ) Notice: Subject to any disclaimer, the term of this patent is extended or adjusted under 35 U.S.C. 154(b) by 244 days.

(21) Appl. No.: 15/068,882

(22) Filed: Mar. 14, 2016

(65) Prior Publication Data

US 2016/0286771 A1    Oct. 6, 2016

(30) Foreign Application Priority Data

Mar. 30, 2015   (JP) ................................ 2015-069340
Jan. 21, 2016   (JP) ................................ 2016-009874

(51) Int. Cl.
    *A01K 87/04*      (2006.01)
    *A01K 87/02*      (2006.01)

(52) U.S. Cl.
    CPC .............. *A01K 87/04* (2013.01); *A01K 87/02* (2013.01)

(58) Field of Classification Search
    CPC ................................. A01K 87/04; A01K 87/02
    USPC ............................................................ 43/24
    See application file for complete search history.

(56) References Cited

U.S. PATENT DOCUMENTS

| | | | | |
|---|---|---|---|---|
| 25,693 A | * | 10/1859 | Pritchard | A01K 87/04 43/24 |
| 173,534 A | * | 2/1876 | Endicott | A01K 87/00 43/25 |
| 189,120 A | * | 4/1877 | McClintock | F16B 21/12 403/316 |
| 931,277 A | * | 8/1909 | Crane | A01K 87/00 403/361 |
| 1,078,589 A | * | 11/1913 | Meyer | A01K 87/04 43/24 |
| 1,231,150 A | * | 6/1917 | Gere | A01K 87/00 43/18.1 R |

(Continued)

FOREIGN PATENT DOCUMENTS

| | | | |
|---|---|---|---|
| CN | 1248574 | 4/2006 | |
| DE | 2623349 C2 * | 3/1982 | ............. A01K 87/04 |

(Continued)

OTHER PUBLICATIONS

Office Action of Chinese Patent Application No. 201610186490.8 dated May 31, 2018 with English translation.

(Continued)

*Primary Examiner* — Darren W Ark
(74) *Attorney, Agent, or Firm* — DLA Piper LLP (US)

(57) ABSTRACT

One object is to provide a lightweight and low-cost fixing structure for a fishing line guide which allows simple and secure fixing and a fishing rod employing the fixing structure. The fixing structure for a fishing line guide according to the present invention comprises: a fishing line guide including an opening for guiding a fishing line and a circular portion having an insertion hole through which the fishing line is to be passed; and two fixing pipes contacting a front surface and a rear surface of the circular portion, wherein the circular portion and end surfaces of the fixing pipes are inclined at a same angle with respect to a vertical plane orthogonal to an axial direction of the fishing rod.

22 Claims, 9 Drawing Sheets

(56) References Cited

U.S. PATENT DOCUMENTS

| | | | | |
|---|---|---|---|---|
| 1,450,700 A * | 4/1923 | Mull | A01K 87/02 | 43/18.1 CT |
| 1,473,437 A * | 11/1923 | Lindstrom | A01K 87/04 | 43/24 |
| 1,871,229 A * | 8/1932 | Welch | A01K 87/02 | 43/18.1 CT |
| 2,038,175 A * | 4/1936 | Hugenroth | A01K 87/04 | 43/24 |
| 2,266,643 A * | 12/1941 | Kruse | A01K 87/02 | 403/329 |
| 2,292,519 A * | 8/1942 | Hiner | A01K 87/00 | 43/18.1 R |
| 2,317,129 A * | 4/1943 | Brown | A01K 87/04 | 43/24 |
| 2,360,802 A * | 10/1944 | Stenz | A01K 87/04 | 242/157 R |
| 2,452,788 A * | 11/1948 | Peters | A01K 87/025 | 43/17 |
| 2,561,675 A * | 7/1951 | Ross | A01K 87/04 | 242/157 R |
| 2,601,351 A * | 6/1952 | Wilburn | A01K 87/02 | 403/300 |
| 2,623,317 A * | 12/1952 | De Maria | A01K 87/04 | 43/24 |
| 2,650,447 A * | 9/1953 | Johnson | A01K 87/04 | 43/24 |
| 3,063,186 A * | 11/1962 | Ward, IV | A01K 87/04 | 43/24 |
| 3,171,229 A * | 3/1965 | Shobert | A01K 87/04 | 43/24 |
| 3,310,903 A * | 3/1967 | Binvignat | A01K 87/02 | 43/18.5 |
| 3,400,481 A * | 9/1968 | Christenson | A01K 87/04 | 156/86 |
| 3,760,524 A * | 9/1973 | Butler, Jr. | A01K 87/04 | 156/165 |
| 3,971,151 A * | 7/1976 | Banner | A01K 87/04 | 43/24 |
| 4,051,618 A * | 10/1977 | Ohmura | A01K 87/04 | 43/24 |
| 4,070,785 A * | 1/1978 | Hawk | A01K 87/04 | 242/157 R |
| 4,080,748 A * | 3/1978 | Ohmura | A01K 87/04 | 43/24 |
| 4,186,508 A * | 2/1980 | Howald | A01K 87/04 | 156/169 |
| 4,445,293 A * | 5/1984 | Ohmura | A01K 87/04 | 43/24 |
| 4,656,804 A * | 4/1987 | Foissac | E04H 12/02 | 43/18.5 |
| 4,726,139 A * | 2/1988 | Tokuda | A01K 87/06 | 43/22 |
| 5,090,150 A * | 2/1992 | Pirazzini | A01K 87/04 | 43/24 |
| 5,159,776 A * | 11/1992 | Horton | A01K 87/005 | 43/24 |
| 5,181,336 A * | 1/1993 | Yasui | A01K 87/04 | 43/24 |
| 5,311,695 A * | 5/1994 | Yasui | A01K 87/04 | 43/24 |
| 5,361,529 A * | 11/1994 | Lindler | A01K 87/04 | 43/24 |
| 5,560,139 A * | 10/1996 | Lembree | A01K 87/04 | 43/24 |
| 5,564,214 A * | 10/1996 | Tsurufuji | A01K 87/005 | 43/24 |
| 5,713,151 A * | 2/1998 | Matumoto | A01K 87/002 | 43/18.1 HR |
| 9,510,573 B2 * | 12/2016 | Sugaya | A01K 99/00 | |
| 2018/0168137 A1 * | 6/2018 | Omura | A01K 87/04 | |

FOREIGN PATENT DOCUMENTS

| | | | | |
|---|---|---|---|---|
| EP | 0345401 A1 * | 12/1989 | | A01K 87/04 |
| EP | 345401 A1 | 12/1989 | | |
| EP | 2749161 A4 * | 6/2015 | | A01K 87/04 |
| EP | 2888938 B1 * | 4/2017 | | A01K 87/06 |
| EP | 2749161 B1 * | 1/2018 | | A01K 87/04 |
| EP | 2575440 B1 * | 11/2018 | | A01K 87/04 |
| FR | 2263686 A2 * | 10/1975 | | A01K 87/04 |
| FR | 2454756 A1 * | 11/1980 | | A01K 87/04 |
| FR | 2665333 A1 * | 2/1992 | | A01K 87/025 |
| FR | 2665333 A1 | 2/1992 | | |
| GB | 1514368 A * | 6/1978 | | A01K 87/04 |
| GB | 2157531 A * | 10/1985 | | A01K 87/04 |
| GB | 2250413 A * | 6/1992 | | A01K 87/04 |
| GB | 2250413 A | 6/1992 | | |
| JP | 51-035596 | 3/1976 | | |
| JP | 53-150792 U | 11/1978 | | |
| JP | 56-2405 U | 6/1979 | | |
| JP | 03083532 A * | 4/1991 | | |
| JP | 03-025569 | 6/1991 | | |
| JP | 03155736 A * | 7/1991 | | |
| JP | H0548667 U * | 6/1993 | | |
| JP | 05176661 A * | 7/1993 | | |
| JP | 05184268 A * | 7/1993 | | A01K 87/04 |
| JP | H0574265 U * | 10/1993 | | |
| JP | 7007726 Y2 * | 3/1995 | | |
| JP | 7089811 B * | 10/1995 | | |
| JP | 09107849 A * | 4/1997 | | |
| JP | 10004831 A * | 1/1998 | | |
| JP | 10066485 A * | 3/1998 | | |
| JP | 10248449 A * | 9/1998 | | |
| JP | 2000032880 A * | 2/2000 | | |
| JP | 2002291379 A * | 10/2002 | | |
| JP | 2003070384 A * | 3/2003 | | |
| JP | 2004337105 A * | 12/2004 | | |
| JP | 2007289087 A * | 11/2007 | | |
| JP | 4023599 B2 * | 12/2007 | | |
| JP | 4275457 B2 * | 6/2009 | | |
| JP | 2010130987 A * | 6/2010 | | |
| JP | 2010154860 A * | 7/2010 | | |
| JP | 4547566 B2 * | 9/2010 | | |
| JP | 2011103817 A * | 6/2011 | | |
| JP | 4836182 B2 * | 12/2011 | | |
| JP | 2012075362 A * | 4/2012 | | |
| JP | 5180944 B2 * | 4/2013 | | |
| JP | 5555419 B2 * | 7/2014 | | |
| JP | 5606858 B2 * | 10/2014 | | |
| JP | 6041640 B2 * | 12/2016 | | |
| JP | 2017000067 A * | 1/2017 | | |
| JP | 6161672 B2 * | 7/2017 | | |
| JP | 6247587 B2 * | 12/2017 | | |
| KR | 20040099118 A * | 11/2004 | | |
| KR | 101022108 B1 * | 3/2011 | | |

OTHER PUBLICATIONS

Office Action of Korean Patent Application No. 10-2016-0036097 dated Apr. 18, 2018 with English translation.
Extended European Search Report dated Sep. 12, 2016 for Application No. 16160685.0.
Notification of Reasons for Refusal Japanese Patent Application No. 2016-009874 dated Nov. 13, 2018 with English translation.
Notification of Reason for Refusal Korean Patent Application No. 10-2016-0036097 dated Nov. 20, 2018 with English translation.

* cited by examiner

FIXING STRUCTURE FOR FISHING LINE GUIDE, AND FISHING ROD

CROSS-REFERENCE TO RELATED APPLICATIONS

This application is based on and claims the benefit of priority from Japanese Patent Application Serial Nos. 2015-069340 (filed on Mar. 30, 2015) and 2016-009874 (filed on Jan. 21, 2016), the contents of which are hereby incorporated by reference in their entirety.

TECHNICAL FIELD

The present invention relates to a fixing structure for a fishing line guide on a fishing rod, and a fishing rod having a fishing line guide mounted thereon using the fixing structure.

BACKGROUND

Typically, a fishing line guide provided on a fishing rod includes an opening formed by a guide ring through which a fishing line is to be passed, and a leg to be placed and fixed on the surface of the fishing rod. A fishing rod has a plurality of fishing line guides fixed on the surface thereof and arranged longitudinally at regular intervals. An example of known methods for fixing a fishing line guide on the surface of a fishing rod is to bind the leg of the fishing line guide onto the surface of the fishing rod with a thread and then apply a resin (thread setting agent) to the thread wound on the leg, as disclosed in Japanese Utility Model Application Publication No. 551-35596.

There is known a fishing line guide (also referred to as a free guide) not placed on the surface of the fishing rod but having different structure as disclosed in Japanese Utility Model Application Publication No. H03-25569, which has an insertion hole through which the fishing rod is to be inserted so as to fix the fishing line guide on the fishing rod by press-fitting or adhesion. This fishing line guide is also known to have unevenness in the inner surface of the member around the insertion hole to be contacted with the surface of the fishing rod, thereby to prevent rotation of the fishing line guide relative to the fishing rod.

In the above method of fixing the fishing line guide disclosed in Japanese Utility Model Application Publication No. S51-35596, the weight of the fishing rod may be increased in connection with the thickness of the thread necessary to ensure the fixing and the amount of the thread setting agent applied. In addition, it is difficult to maintain the strength for a long period in a harsh fishing environment; a crack may occur in the thread setting agent and the fishing line guide may come off due to bending of the fishing rod. Further, this method requires a skill in fixing the fishing line guide, leading to instable qualities and higher costs. The fixing method disclosed in Japanese Utility Model Application Publication No. H03-25569 is applied mainly to rod joints of the fishing rod Since the small adhesion area with the fishing rod leads to an insufficient adhesion strength, the fishing line guide tends to come off.

SUMMARY

The present invention is intended to overcome the above problem. One object of the present invention is to provide a lightweight and low-cost fixing structure for a fishing line guide which allows simple and secure fixing and a fishing rod having a fishing line guide mounted thereon using the fixing structure.

To the above end, a fixing structure for a fishing line guide according to the present invention comprises: a fishing line guide including an opening for guiding a fishing line and a circular portion having an insertion hole through which the tip rod of a fishing rod is to be passed; and two fixing pipes contacting a front surface and a rear surface of the circular portion of the fishing line guide so as to fix the fishing line guide on the fishing rod, wherein the circular portion of the fishing line guide and end surfaces of the fixing pipes contacting the circular portion are inclined, in a side view, at a same angle with respect to a vertical plane orthogonal to an axial direction of the fishing rod, and the fishing line guide is squeezed between the two fixing pipes and fixed on the fishing rod.

In the above fixing structure for a fishing line guide, the fixing pipes are fitted on the fishing rod, and the circular portion of the fishing line guide including the insertion hole is fitted on the fishing rod adjacent to the fixing pipes, such that the end surfaces of the fixing pipes contact the surfaces of the circular portion, thereby to fix the fishing line guide on the fishing rod. Thus, the fishing line guide is fixed with respect to the axial direction by the fixing pipes. Further, the circular portion and the end surfaces of the fixing pipes are inclined at a same angle with respect to the vertical plane orthogonal to the axial direction of the fishing rod; therefore, the fishing line guide is restricted from rotating in the circumferential direction and thus is also fixed with respect to the rotational direction. Thus, the fishing line guide is fixed with respect to the axial and circumferential directions by the fixing pipes fixed on the fishing rod and restricted; therefore, the fishing line guide can be simply and securely fixed without need of winding a thread on the leg of the fishing line guide as in the conventional arts.

The circular portion and the fixing pipes contact each other while being inclined at a same angle with respect to the vertical plane orthogonal to the axial direction of the fishing rod. This contact may be between a part of the circular portion and a part of the end surfaces of the fixing pipes. That is, the fishing line guide can be prohibited from rotating in the circumferential direction as long as any part of the circular portion and any part of the end surfaces of the fixing pipes contact each other while being inclined at a same angle with respect to the vertical plane orthogonal to the axial direction of the fishing rod.

The present invention provides a lightweight and low-cost fixing structure for a fishing line guide which allows simple and secure fixing and a fishing rod having a fishing line guide mounted thereon using the fixing structure.

BRIEF DESCRIPTION OF THE DRAWINGS

FIGS. 8a and 8b show a sixth embodiment of the present invention, wherein

DESCRIPTION OF EXAMPLE EMBODIMENTS

Figure 1:
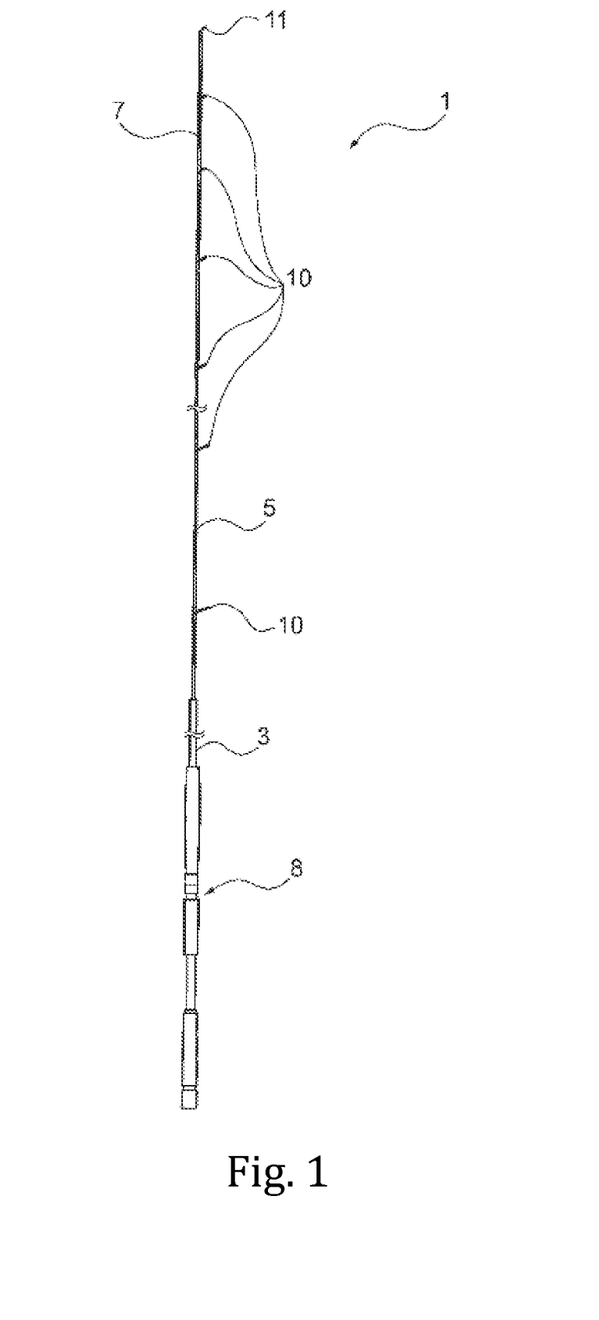
FIG. 1 shows a fishing rod according to the present invention.

A fishing rod according to the invention will be hereinafter described with reference to the drawings. FIG. 1 shows a fishing rod according to the present invention. The fishing rod 1 may include a plurality of rods jointed together. In the embodiment, the fishing rod 1 may include a base rod 3, an intermediate rod 5, and a tip rod 7; and these three rods may be telescopically jointed together. The casting rod 1 may either include no intermediate rod 5 or include two or more intermediate rods jointed together. Also, the fishing rod may either include a plurality of rods jointed together in an ordinary or counter ordinary manner or include a single rod.

The base rod 3 may be provided with a reel seat 8 for fixing a fishing reel. Each of the rods may be provided on the outer circumferential surface thereof with a plurality of line guides 10 for guiding a fishing line released from the fishing reel; and a top guide 11 may be fixed on the distal end. A desired number of line guides may be disposed on the rods.

The base rod 3 and the intermediate rod 5 may be formed of a tube made of a fiber reinforced resin. More specifically, these rods may be formed in accordance with a conventional method, including rolling on a core bar a fiber reinforced resin prepreg (a prepreg sheet) including reinforcement fibers (such as carbon fibers and glass fibers) impregnated with a synthetic resin (thermosetting synthetic resin, thermoplastic synthetic resin) such as an epoxy resin, heating the prepreg sheet, and pulling out the core bar. The tip rod 7 may be either tubular or solid and may be formed of a fiber-reinforced resin or a metal.

Figure 2A:
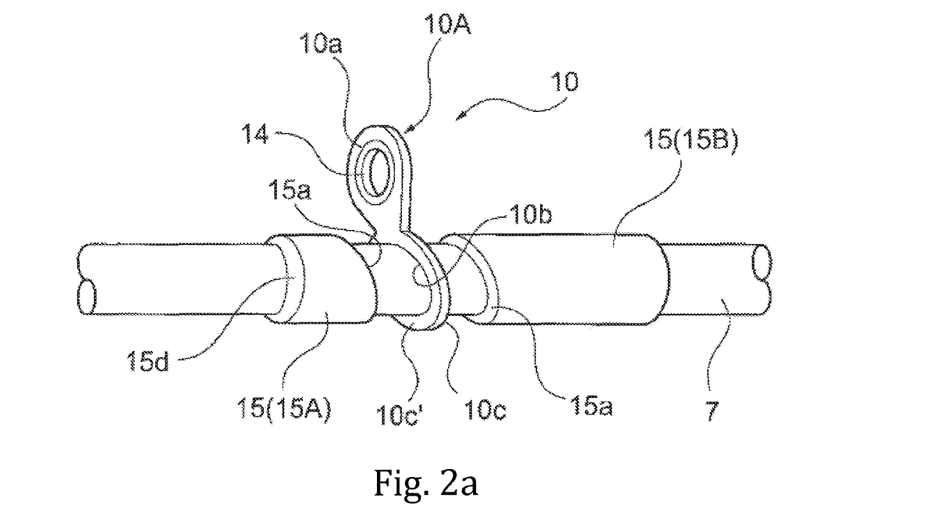
FIG. 2a is a perspective view of a first embodiment of the present invention.
Figure 2B:
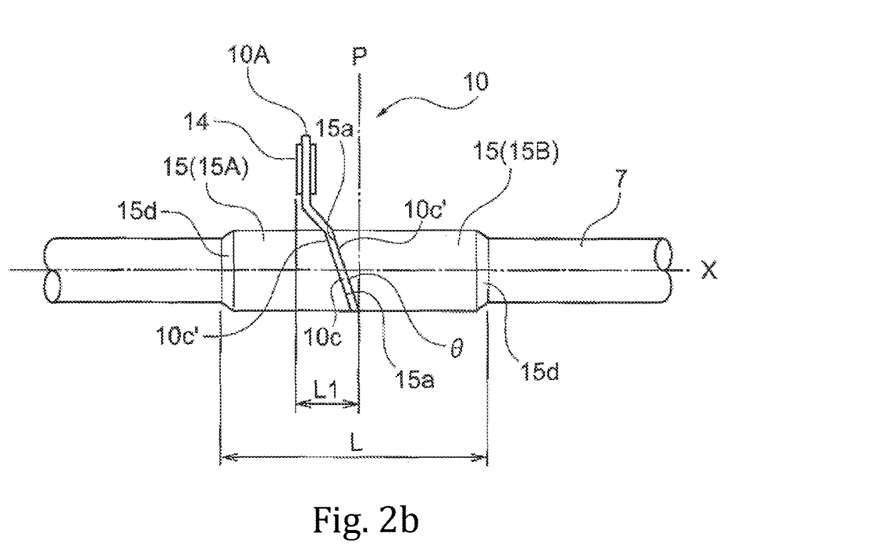
FIG. 2b is a side view of the same.

FIG. 2a is a perspective view of a first embodiment of the present invention; and FIG. 2b is a side view of the same. FIGS. 2a and 2b show a fishing line guide mounted on the tip rod 7, and fishing line guides mounted on other sites may be in the same arrangement.

The fishing line guide 10 may include a frame 10A having a circular (or oval) opening 10a for guiding a fishing line released from the fishing reel and an insertion hole 10b located below through which the tip rod 7 (hereinafter referred to as "the fishing rod") is inserted. The frame 10A may be constituted by, e.g., a metal material such as a titanium alloy or a thermosetting or thermoplastic plastic reinforced with reinforcement fibers such as carbon fibers or glass fibers, and may be formed of, e.g., a metal planar plate punched into a predetermined shape or a prepreg sheet made of a fiber-reinforced resin pressed with a die. The frame 10A may have a guide ring 14 disposed around the opening 10a and formed of ceramic, titanium, titanium alloy, etc., and a fishing line may slide on the guide ring 14.

The frame 10A may include a circular portion 10c forming the insertion hole 10b. The circular portion 10c may extend downward from the portion on the opening 10a; as shown in FIGS. 2a and 2b, the surfaces 10c' (on both sides) of the circular portion 10c may be inclined at an angle θ with respect to the vertical plane P which is orthogonal to the axial direction X of the fishing rod. Therefore, the insertion hole 10b may be formed in an oval shape. As shown in FIGS. 2a and 2b, the entirety of the circular portion 10c may be inclined with respect to the vertical plane P, or a portion thereof may be inclined, so as to form the inclined surfaces 10c'.

The fishing rod 7 may be provided with a fixing pipe 15 having a tubular shape and fixed with the end surface 15a thereof contacted with the circular portion 10c of the frame 10A. This fixing pipe may preferably be formed of the same material as the fishing rod (a thermosetting or thermoplastic plastic reinforced with reinforcement fibers such as glass fibers or carbon fibers), and the fixing pipe formed of such a material can be readily fabricated by rolling the prepreg sheet described above around a mandrel, heating the prepreg sheet, and pulling out the mandrel, as with a tube made of a fiber-reinforced resin and used as an ordinary fishing rod.

The fixing pipe of this embodiment may be cut at an angle θ such that an end thereof is in surface contact with the ring-shaped surface 10c' of the circular portion 10c of the frame 10A. Therefore, the end surface 15a may have an oval shape, and the circular portion 10c and the fixing pipe 15 may be in surface contact with each other while being inclined at the same angle θ with respect to the vertical plane P orthogonal to the axial direction X of the fishing rod 7.

In the embodiment, the fixing pipe 15 may include a pair of fixing pipes (a tip-side fixing pipe 15A, a proximal fixing pipe 15B) arranged on both axial sides of the circular portion 10c, and these fixing pipes 15A, 15B may be fixed on the surface of the fishing rod such that the end surfaces 15a thereof may be in surface contact with the surfaces 10c' of the circular portion 10c. In fixing the fixing pipes, an adhesive (such as epoxy-based, silicon acrylate-based, or cyanoacrylate-based adhesive) may be applied to predetermined positions on the surface of the fishing rod 7, the proximal fixing pipe 15B may be fitted and fixed on the fishing rod, and then the fishing line guide 10 may be fitted on the fishing rod. Further, the adhesive may be applied to the tip side of the fishing line guide 10, and the tip-side fixing pipe 15A may be fitted on the fishing rod, such that the fishing line guide 10 may be fixed at a predetermined position with the circular portion 10c thereof being retained between the end surfaces 15a of the fixing pipes 15A, 15B. The fixing pipes 15A, 15B may be either adhered to the frame 10A or not.

When the fishing line guide is fixed between a pair of fixing pipes, the fishing line guide may be fixed with respect to the axial direction of the fishing rod. Further, the fishing line guide may be restricted from rotating in the circumferential direction and thus may be fixed with respect to the rotational direction, because the circular portion 10c of the fishing line guide and the fixing pipes 15A, 15B are in surface contact with each other while being inclined with respect to the vertical plane P orthogonal to the axial direction X of the fishing rod. That is, the fishing line guide 10 may eliminate the need of winding a thread and can be fixed on the fishing rod simply by fitting the fixing pipes and the fishing line guide on the fishing rod, and the fishing line guide may be restricted by the fixing pipes 15A, 15B from moving in the axial direction and rotating in the circumferential direction of the fishing rod, thereby achieving secure fixing. Since a larger adhesion area can be obtained than in the case of fixing with a thread, the above structure having a small weight can provide the same adhesion strength as in the case of fixing with a thread.

The fixing pipes may be formed of a material less prone to cracking; and therefore, even when the fishing rod is bent largely, no cracking or noise occurs as in the case of fixing with a thread, leading to increased durability and freedom from maintenance.

Further, since the weight can be reduced as compared to the case of fixing with a thread, the fishing rod as a whole can have a smaller weight. Since elongated fixing pipes do not lead to a larger weight, it may be possible to elongate the fixing pipes to some degree in the axial direction so as to enhance the appearance (the external design of the fishing rod) while increasing the adhesion strength. More specifically, because of the small weight, the axial length L of the fixing pipes may be larger than the axial length L1 of the fishing line guide 10. Thus, the portion near the fishing line guide can be made thicker over some degree of length along the axial direction, thereby enhancing the external design. Additionally, since the fixing pipes can be previously provided with colors or patterns and then fixed on the fishing rod, the design can be readily enhanced or modified.

When the inclination angle θ, at which the end surfaces of the fixing pipes and the surfaces of the circular portion are in contact with each other, is less than 90°, the fishing line guide under a rotational force can be restricted from rotating. Further, in consideration of the workability and reduced strength due to the bending angle at the portion between the circular portion 10b and the opening 10a, the inclination angle θ should preferably be between 10 and 50°.

The fixing pipe 15 described above may be formed of the same material (a fiber-reinforced resin material) as the fishing rod so as to have a bending property similar to that of the fishing rod, thereby restricting the impact on the bending property of the fishing rod and enhancing the vibration conductivity for a nibble. If the fishing line guide 10 is also formed of a fiber-reinforced resin material, it may be possible to reduce the weight and enhance the vibration conductivity without affecting the bending property of the fishing rod.

If the fixing pipe is formed of a fiber-reinforced resin material as described above, the fiber-reinforced resin material should preferably include a larger proportion of reinforcement fibers oriented in the circumferential or inclined direction than that of reinforcement fibers oriented in the axial direction. That is, because of the smaller proportion of the reinforcement fibers oriented in the axial direction, the fixing pipe may have a lower rigidity and thus is less prone to inhibit the bending of the fishing rod.

Further, the end edges of the fixing pipe 15 (not in contact with the circular portion) should preferably have chamfered (tapered) portions 15d. Such chamfered portions may effectively prevent snagging of the fishing line.

Next, the second embodiment of the invention will be described. In the following description of the embodiment, the same elements as in the embodiment shown in FIGS. 2a and 2b will be denoted by the same reference numerals and detailed descriptions thereof will be omitted.

Figure 3:
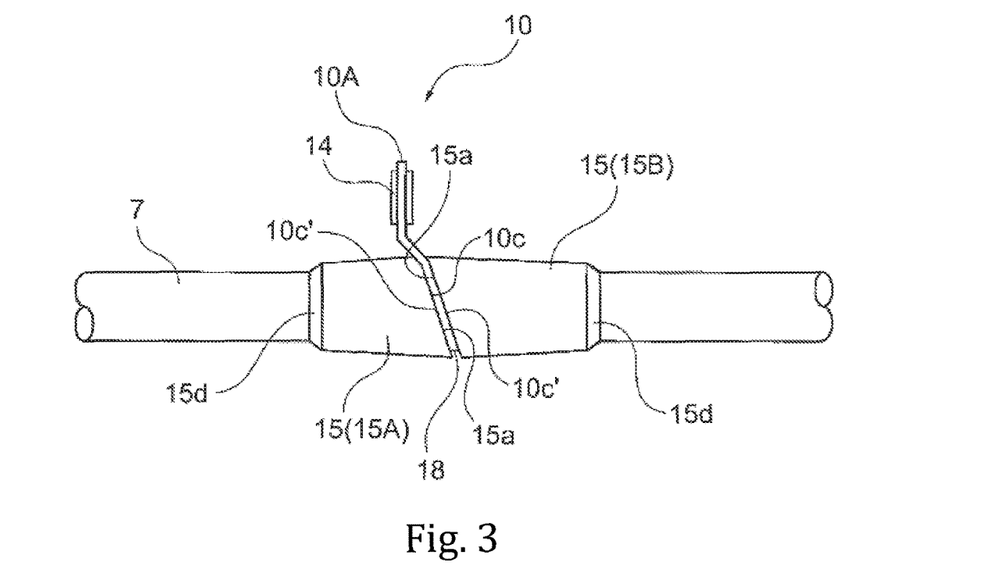
FIG. 3 is a side view of a second embodiment of the present invention.

FIG. 3 is a side view of the second embodiment. In this embodiment, the fixing pipes 15A, 15B may be formed so as to protrude gradually toward the fishing line guide.

The thickness of the fixing pipe can be thus changed to enhance the external design. Further, there may be a step 18 between the outer circumference of the circular portion 10c and the surface of the fixing pipe, as shown in FIG. 3. That is, the end edges 15a of the fixing pipes may not be entirely in surface contact with the surfaces 10c' of the circular portion 10c, or conversely, the outer circumference of the circular portion 10c may protrude beyond the surfaces of the fixing pipes such that the surfaces 10c' of the circular portion 10c are not entirely in surface contact with the end edges 15a of the fixing pipes. In the latter case, the outer circumference of the circular portion 10c may project beyond the surface of the fixing pipe 15, and thus the projecting portion of the circular portion 10c should preferably be chamfered.

Figure 4:
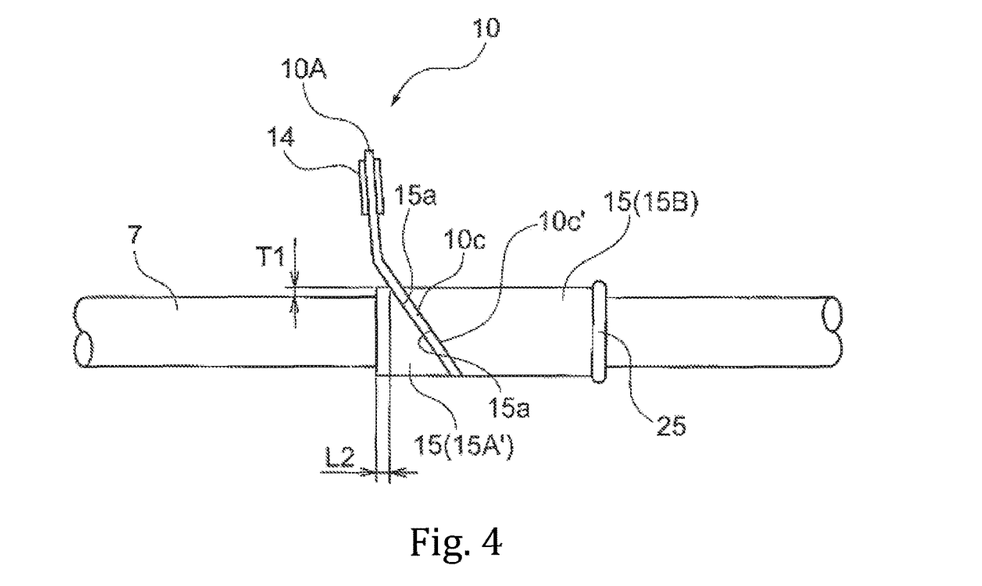
FIG. 4 is a side view of a third embodiment of the present invention.

FIG. 4 is a side view of the third embodiment of the present invention. In the first and second embodiments described above, the two fixing pipes provided on both sides of the circular portion of the fishing line guide may have the same length. In contrast, the tip-side fixing pipe 15A' of this embodiment may have a smaller length for weight reduction. That is, the fishing line guide 10 may be restricted by the fixing pipes from moving in the axial direction and rotating in the circumferential direction, as described above. Therefore, the fixing pipes can be formed so as to have a small length. More specifically, the tip-side fixing pipe 15A' may be formed such that the distance from the distal end edge to the upper end of the contacting portion contacting the circular portion 10c may be 0 mm at the minimum. However, since it may be preferable to ensure some degree of strength in the surface contact area at the upper end, the distance L2 should preferably be axially small (smaller than the axial length of the proximal fixing pipe 15B) but equal to or larger than the thickness T1 of the fixing pipe (L2>=T1).

Further, the fixing pipe 15 may have a decorative ring 25 attached to the end edge thereof, as shown in FIG. 4. Thus, use of the fixing pipe may allow addition of decoration for enhancing the appearance of the fixing portion of the fishing line guide.

Figure 5:
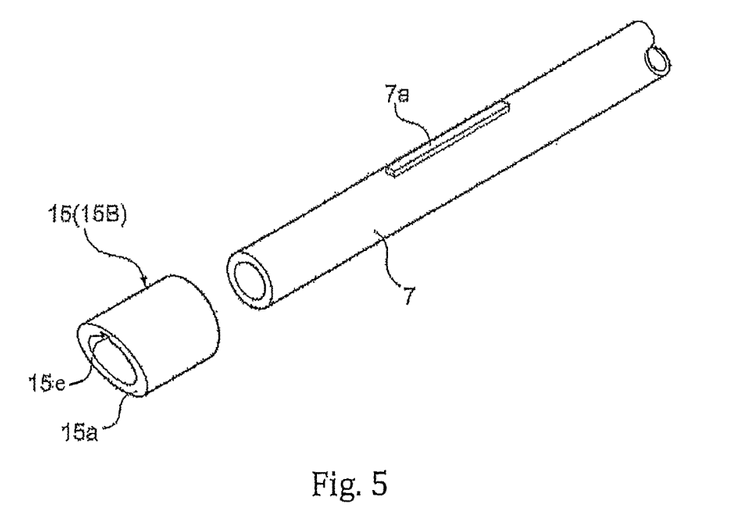
FIG. 5 is a perspective view of a fourth embodiment of the present invention, showing a fixing pipe and the fishing rod.
Figure 6A:
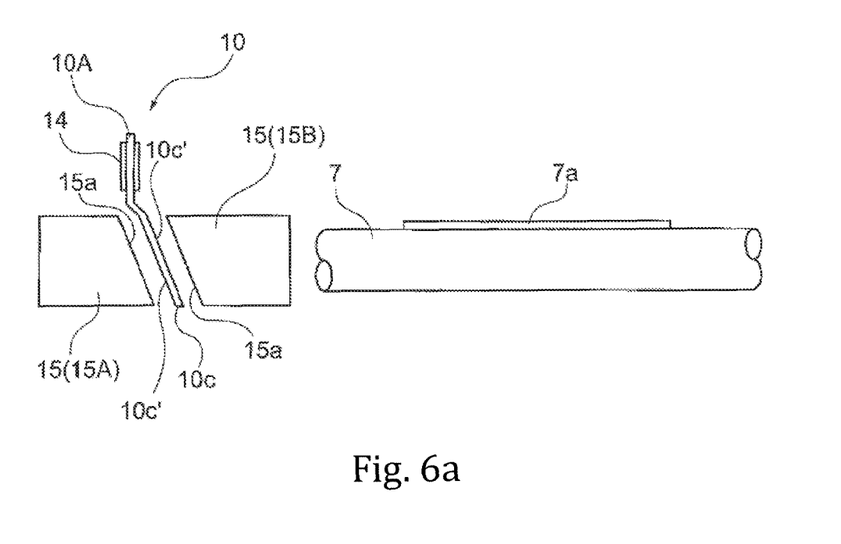
FIG. 6a is a side view of the embodiment of FIG. 5 showing an arrangement where a fishing line guide is being fixed with a pair of fixing pipes.
Figure 6B:
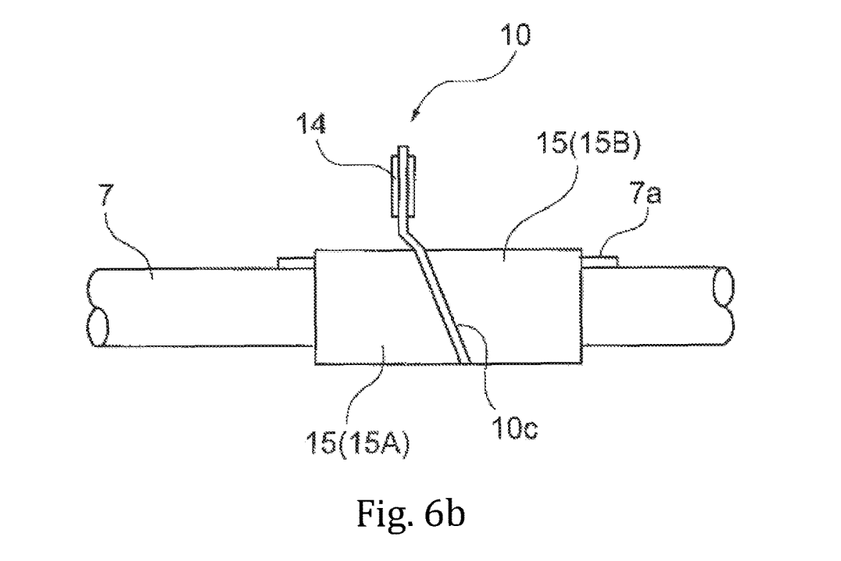
FIG. 6b is a side view showing an arrangement where the fishing line guide has been fixed on the fishing rod.

FIG. 5 and FIGS. 6a and 6b show the fourth embodiment of the present invention, wherein FIG. 5 is a perspective view showing the fixing pipe and the fishing rod, FIG. 6a is a side view showing an arrangement where a fishing line guide is being fixed with a pair of fixing pipes, and FIG. 6b is a side view showing an arrangement where the fishing line guide has been fixed on the fishing rod.

In the embodiment, an engagement projection 7a may be integrally formed on a portion of the surface of the fishing rod 7 along the axial direction, and an engagement recess 15e may be formed in a portion of the inner circumferential surface of the fixing pipe 15 (15A, 15B) along the axial direction such that the engagement projection 7a may be fitted into the engagement recess 15e.

With such an arrangement, the fixing pipes 15A, 15B may be fixed on the fishing rod 7 so as to be securely prevented from rotating in the circumferential direction, achieving secure fixing of the fishing line guide 10. Conversely, it may also be possible that the fixing pipe has a projection and the fishing rod has a recess. Moreover, the shape of the projection and recess can be appropriately modified.

Figure 7:
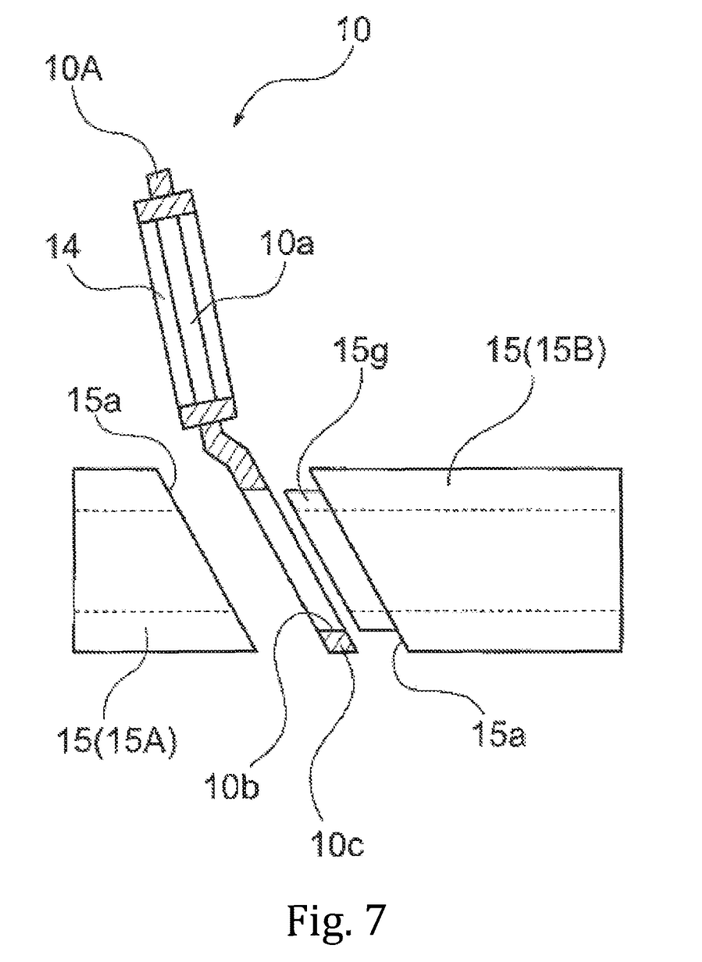
FIG. 7 is a side view of a fifth embodiment of the present invention, showing the fixing pipe and the fishing line guide.

FIG. 7 is a side view of the fifth embodiment of the present invention (the fishing line guide is sectioned). In this embodiment, one of the fixing pipes (the proximal fixing pipe 15B) may have a step 15g formed thereon that can be fitted into the circular portion 10c of the fishing line guide 10 That is, the proximal fixing pipe 15B can be fixed on the surface of the fishing rod 7 while being fitted into the fishing line guide 10, and the fixing pipe 15A may be fitted around the fishing rod such that the fishing line guide 10 may be retained between the pair of fixing pipes. In this arrangement, the frame 10A including the insertion hole 10b may not be directly fitted on the fishing rod 7 but fitted around the fishing rod 7 via the step 15g. Additionally, instead of the above arrangement, the step 15g may be formed on the tip-side fixing pipe 15A.

In the above arrangement, the fishing line guide 10 can be readily mounted, and can be securely prevented from rotating by, e.g., roughening the surface of the step. Further, the sectional shape of the step 15g and the shape of the insertion hole 10b may be non-circular, such that the fishing line guide 10 can be securely prevented from rotating.

Figure 8A:
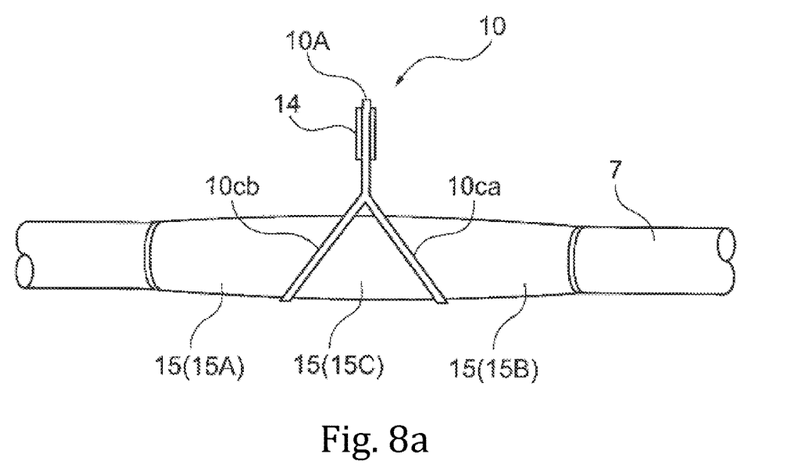
FIG. 8a is a side view showing a fixing site of the fishing line guide.

FIG. 8a is a side view of the sixth embodiment of the present invention. The fishing line guide 10 of this embodiment may include a plurality of circular portions 10ca, 10cb each defining an insertion hole through which the fishing rod is to be inserted. This structure is similar to that of the common two-leg fishing line guide.

Thus, when a plurality of circular portions are formed (a plurality of legs are formed), a fixing pipe 15c may be disposed in the intermediate portion such that each of the circular portions 10ca, 10cb may be retained between the fixing pipes, and thus the fishing line guide may be securely fixed with respect to the axial and circumferential directions. The proximal circular portion 10ca may be fixed with the two fixing pipes 15B, 15C, and the tip-side circular portion 10cb may be fixed with the fixing pipe 15A, 15C. It may also be possible that the middle fixing pipe 15C is omitted, the tip-side fixing pipe 15A is omitted, or the proximal fixing pipe 15B is omitted. However, the arrangement of the embodiment may be more preferable in actual designing because the circular portions and the fixing pipes may be removed when the fishing line guide is subjected to a large stress.

Figure 8B:
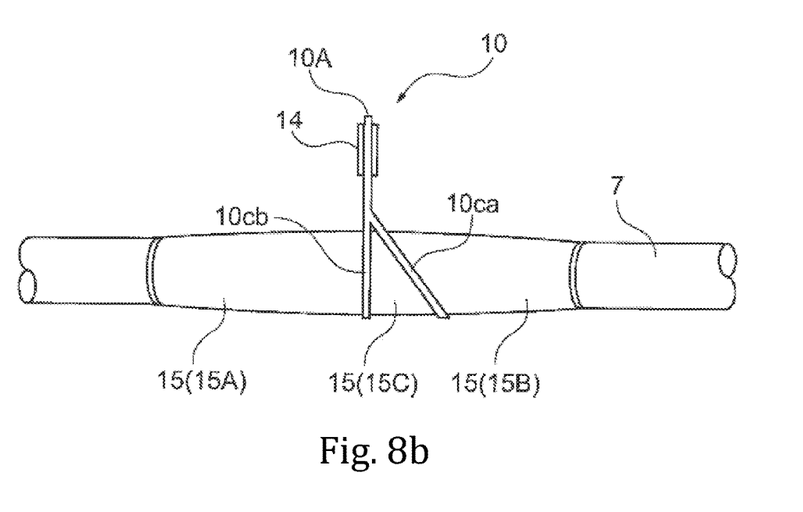
FIG. 8b is a side view showing a variation of the same.

In the arrangement shown in FIG. 8a, the plurality of legs may diverge obliquely from each other in a side view. It may also be possible that, as shown in FIG. 8b, one of the legs (e.g., the leg for the circular portion 10cb) may extend downward straightly from the frame 10A (in the direction orthogonal to the axial direction). As described above, it may also be possible that the middle fixing pipe 15C is omitted, the tip-side fixing pipe 15A is omitted, or the proximal fixing pipe 15B is omitted. However, the arrangement of the embodiment may be more preferable in actual designing because the circular portions and the fixing pipes may be removed when the fishing line guide is subjected to a large stress.

Figure 9A:
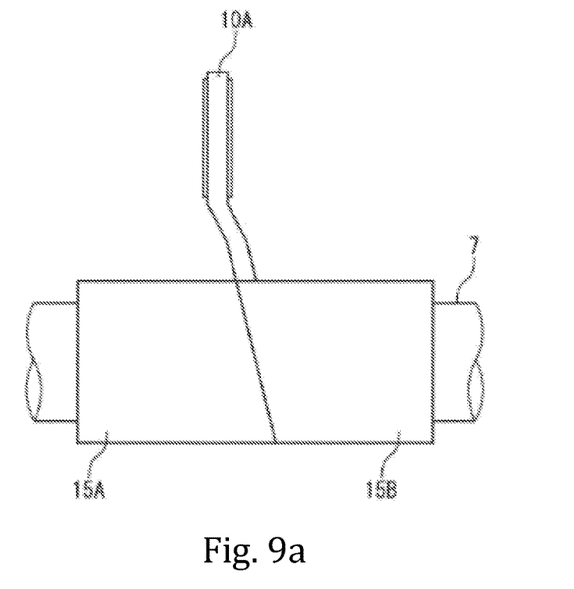
FIG. 9a is a side view of a seventh embodiment of the present invention.
Figure 9B:
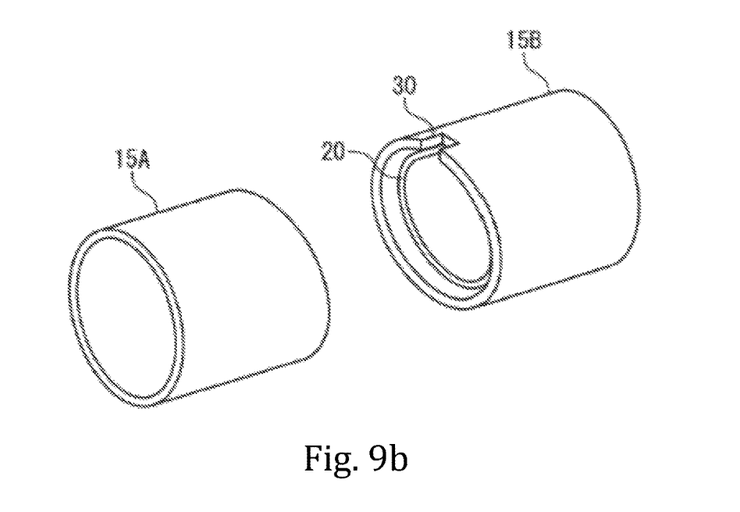
FIG. 9b is a perspective view of the same.

FIGS. 9a and 9b show the seventh embodiment of the present invention. In the first to sixth embodiments described above, the circular portion 10c of the fishing line guide 10 may be positioned between the end surfaces of the two fixing pipes and exposed externally. In contrast, in this embodiment, the circular portion 10c may be embedded inside the contact surfaces of the fixing pipes 15A, 15B so as not to be exposed externally, as shown in FIG. 9a.

As shown in FIG. 9b, a recess 20 into which the circular portion 10c is to be fitted may be formed in the end surface of the proximal fixing pipe 15B. After the circular portion 10c is inserted into the recess, the end surface of the proximal fixing pipe 15B may be contacted with the end surface of the tip-side fixing pipe 15A (which may not have a recess formed therein) so as not to expose the circular portion 10c externally. Conversely, it may also be possible that a recess is formed in the end surface of the tip-side fixing pipe 15A and no recess is formed in the end surface of the proximal fixing pipe 15B. The reference numeral 30 in the drawing denotes a slit formed in the fixing pipe for allowing in the fishing line guide leg.

Figure 10A:
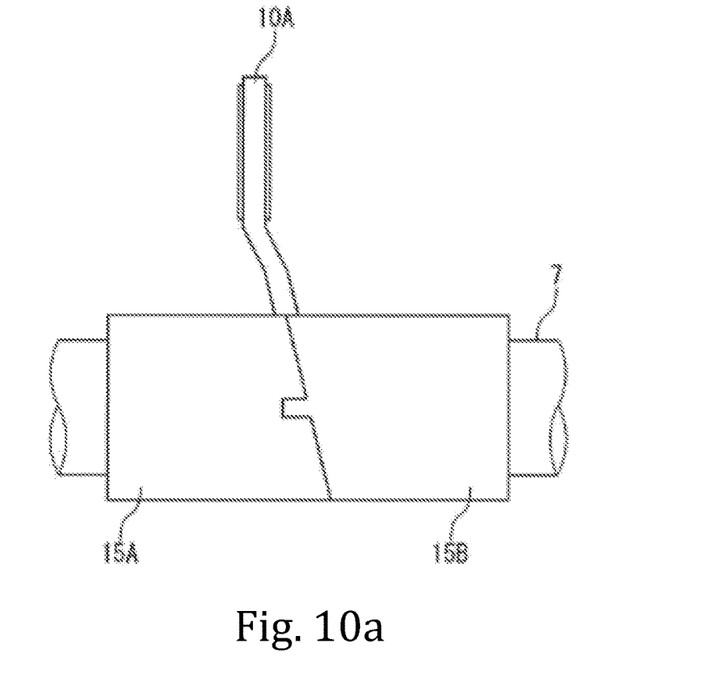
FIG. 10a is a side view of an eighth embodiment of the present invention.
Figure 10B:
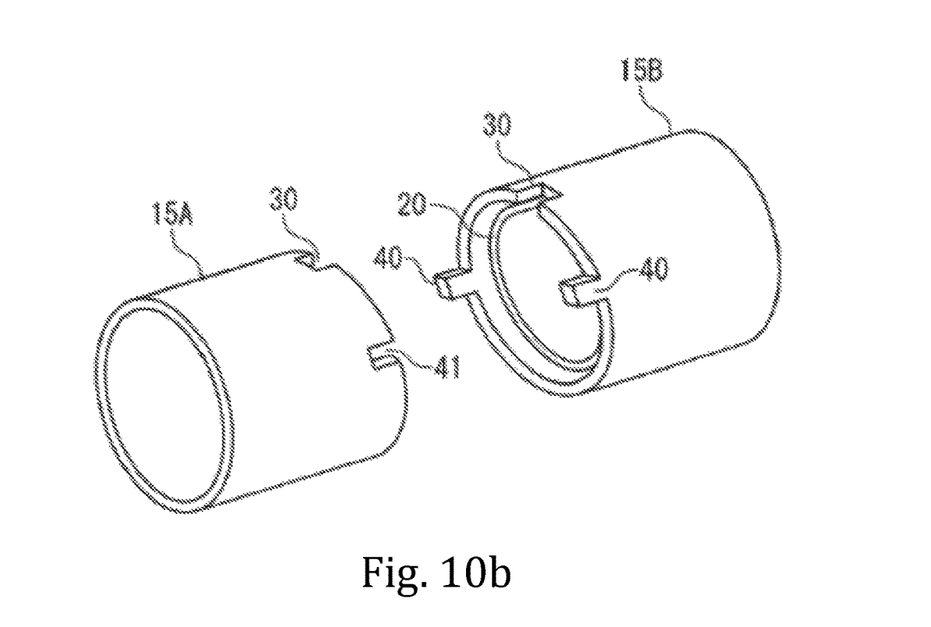
FIG. 10b is a perspective view of the same.

FIGS. 10a and 10b show the eighth embodiment of the present invention. This embodiment is a variation of the seventh embodiment. Both the tip-side fixing pipe 15A and the proximal fixing pipe 15B may have a recess formed in the end surfaces thereof. After the circular portion 10c is inserted into the recesses, the tip-side fixing pipe 15A and the proximal fixing pipe 15B may be contacted with each other so as not to expose the circular portion 10c externally. Additionally, the seventh and eighth embodiments may be configured such that, as shown in FIGS. 10a and 10b, the fixing pipes 15B, 15A have projections 40 and recesses 41 to be engaged with each other for firm meshing.

According to the seventh and eighth embodiments, the fishing line guide 10 mounted on the fixing pipe 15 can be readily fixed on the fishing rod. The leg of the fishing line guide 10 may be fitted into the slit 30 in the fixing pipe 10 so as to further restrict the rotation in the circumferential direction; and additionally, the engagement projection and the engagement recess shown in FIG. 5 may be applied to restrict the rotation more securely.

Embodiments of the present invention are not limited to the above descriptions and are susceptible to various modifications. To prevent the rotation of the fishing line guide in the circumferential direction, the fixing pipes and the fishing line guide may be in surface contact with each other while being inclined with respect to the vertical plane P orthogonal to the axial direction X of the fishing rod. It may also be possible that the surface contact may be replaced with contact between stepped surfaces so as to prevent the rotation of the fishing line guide. Additionally, the shape of the frame 10A may be appropriately modified. For example, it may be inclined forward to prevent snagging of the fishing line.

What is claimed is:

1. A fixing structure in combination with a fishing line guide for mounting on a fishing rod having a tip rod portion, the combination comprising:

the fishing line guide including an opening for guiding a fishing line and a circular portion having an insertion hole through which the tip rod portion of the fishing rod is to be passed; and the fixing structure comprising:

a first fixing pipe having a first end surface contacting a front surface of the circular portion of the fishing line guide; and a second fixing pipe having a second end surface contacting a rear surface of the circular portion of the fishing line guide to fix the fishing line guide on the fishing rod, wherein the circular portion of the fishing line guide and the first and second end surfaces of the first and second fixing pipes contacting the circular portion are inclined, in a side view, at a same angle with respect to a vertical plane orthogonal to an axial direction of the fishing rod when the fixing structure fixes the fishing line guide on the fishing rod, and the opening for guiding the fishing line is offset in the axial direction from the insertion hole of the inclined circular portion, and the fishing line guide is configured to be squeezed between the first and second fixing pipes and fixed on the fishing rod.

2. The fixing structure for a fishing line guide according to claim 1 wherein the fixing pipes are in surface contact with the front surface and the rear surface of the circular portion for squeezing the fishing line guide.

3. The fixing structure in combination with a fishing line guide according to claim 1, wherein one of the first and second fixing pipes contacting the circular portion of the fishing line guide has a recess formed in a respective one of the first and second end surfaces thereof and the circular portion of the fishing line guide is fitted into the recess, or each of the first and second fixing pipes has a recess formed in the first and second end surfaces thereof and the circular portion of the fishing line guide is fitted into the recesses, and the end surfaces of the first and second fixing pipes are in surface contact with each other while retaining the circular portion in the recesses.

4. The fixing structure in combination with a fishing line guide according to claim 1 wherein inner circumferential surfaces of the fixing pipes have an engagement portion for meshing with a surface of the fishing rod.

5. The fixing structure in combination with a fishing line guide according to claim 1 wherein one of the first and second end surfaces of the respective one of the first and second fixing pipes has a step formed thereon on which the circular portion of the fishing line guide is fitted.

6. The fixing structure in combination with a fishing line guide according to claim 5 wherein the fixing pipes include a larger proportion of reinforcement fibers oriented in a circumferential or inclined direction than reinforcement fibers oriented in the axial direction.

7. The fixing structure in combination with a fishing line guide according to claim 1 wherein the fixing pipes are made of a thermosetting or thermoplastic plastic reinforced with reinforcement fibers, and the fishing line guide comprises a portion having the opening for guiding the fishing line which is integrated with the circular portion.

8. The fixing structure in combination with a fishing line guide according to claim 1, wherein the fishing line guide is made of a thermosetting or thermoplastic plastic reinforced with reinforcement fibers.

9. The fixing structure in combination with a fishing line guide according to claim 1, wherein an axial length of the fixing pipes is larger than an axial length of the fishing line guide.

10. The fixing structure in combination with a fishing line guide according to claim 1, wherein the same angle at which the first and second end surfaces of the first and second fixing pipes that are in contact with the circular portion are inclined is from 10 to 50°.

11. A fishing line guide and a fixing pipe therefor, the fishing line guide comprising: a frame including an opening for guiding a fishing line and a circular portion having an insertion hole through which a fishing rod is to be inserted, the fixing pipe comprising a first fixing pipe having a first end surface contacting the circular portion and a second fixing pipe having a second end surface contacting the circular portion, the first fixing pipe and the second fixing pipe squeezing the fishing line guide in an axial direction of the fishing rod to fix the fishing line guide on the fishing rod,
wherein the circular portion of the fishing line guide and the first and second end surfaces of the first and second fixing pipes contacting the circular portion are inclined, in a side view, at a same angle with respect to a vertical plane orthogonal to the axial direction of the fishing rod when the fixing structure fixes the fishing line guide on the fishing rod, and
the opening for guiding the fishing line is offset in the axial direction from the insertion hole of the inclined circular portion.

12. The fishing line guide and the fixing pipe therefor according to claim 11 wherein one of the first and second end surfaces of the respective one of the first and second fixing pipes has a recess formed therein in which the circular portion of the fishing line guide is fitted.

13. The fixing structure for a fishing line guide according to claim 12 wherein the end surfaces of the first and second fixing pipes are in surface contact with each other and have, in respective circumferences thereof, engagement portions for meshing with each other.

14. The fishing line guide and the fixing pipe therefor according to claim 11 wherein the end surfaces of the first and second fixing pipes each have a recess formed therein in which the circular portion of the fishing line guide is fitted.

15. The fishing line guide and the fixing pipe therefor according to claim 11 wherein inner circumferential surfaces of the first and second fixing pipes each have an engagement portion for meshing with a surface of the fishing rod.

16. The fishing line guide and the fixing pipe therefor according to claim 11 wherein one of the first and second end surfaces of the respective one of the first and second fixing pipes has a step formed thereon on which the circular portion of the fishing line guide is fitted.

17. The fishing line guide and the fixing pipe therefor according to claim 11, wherein the first and second fixing pipes are made of a thermosetting or thermoplastic plastic reinforced with reinforcement fibers, and the fishing line guide comprises a portion having the opening for guiding the fishing line which is integrated with the circular portion.

18. The fishing line guide and the fixing pipe therefor according to claim 17, wherein the first and second fixing pipes include a larger proportion of reinforcement fibers oriented in a circumferential or inclined direction than reinforcement fibers oriented in the axial direction of the fishing rod.

19. The fishing line guide and the fixing pipe therefor according to claim 11, wherein the fishing line guide is made of a thermosetting or thermoplastic plastic reinforced with reinforcement fibers.

20. The fishing line guide and the fixing pipe therefor according to claim 11, wherein an axial length of the first and second fixing pipes fixed on the fishing rod is larger than an axial length of the fishing line guide.

21. The fishing line guide and the fixing pipe therefor according to claim 11, wherein the same angle at which the first and second end surfaces of the first and second fixing pipes that are in contact with the circular portion are inclined is 10 to 50°.

22. A fishing rod having mounted thereon at least one fixing structure in combination with a fishing line guide according to claim 1.

* * * * *